(No Model.)
S. L. SHELLENBERGER.
NUT LOCK.
No. 348,426. Patented Aug. 31, 1886.
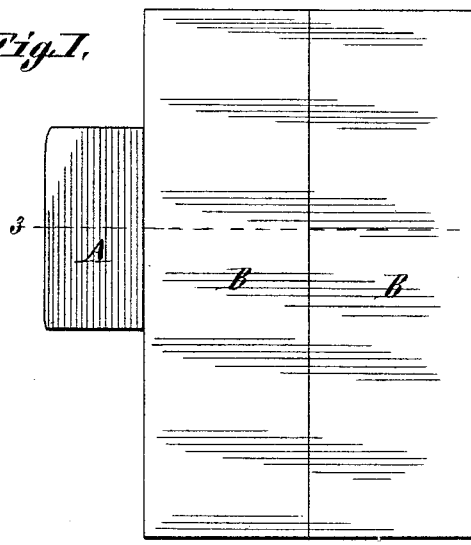
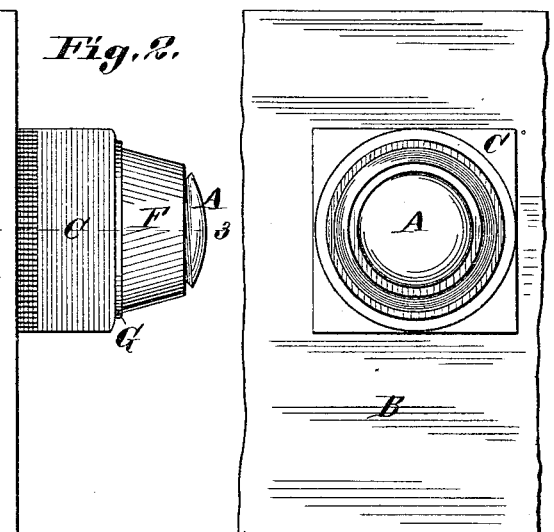
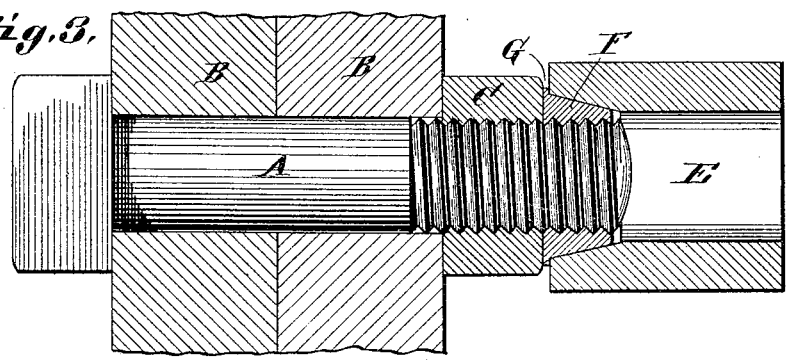
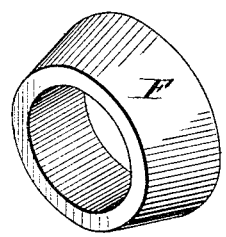
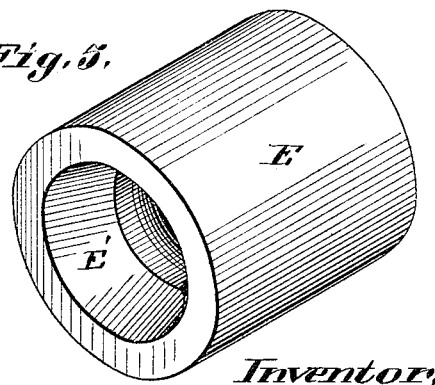
Attest:
Charles Pickles
F. A. Hopkins
Inventor:
S. L. Shellenberger
By Knight Bros
Attys
N. PETERS, Photo-Lithographer, Washington, D. C.

UNITED STATES PATENT OFFICE.

SAMUEL L. SHELLENBERGER, OF DALLAS, TEXAS.

NUT-LOCK.

SPECIFICATION forming part of Letters Patent No. 348,426, dated August 31, 1886.

Application filed January 18, 1886. Serial No. 188,911. (No model.)

*To all whom it may concern:*

Be it known that I, SAMUEL L. SHELLENBERGER, of the city and county of Dallas, in the State of Texas, have invented a certain new and useful Improvement in Nut-Locks, of which the following is a full, clear, and exact description, reference being had to the accompanying drawings, forming part of this specification, and in which—

Figure 1 is a side view of my improved nut-lock. Fig. 2 is an end view. Fig. 3 is a longitudinal section taken on line 3 3, Fig. 1, showing the die for compressing. Fig. 4 is a perspective view of the collar, and Fig. 5 is a perspective view of the die.

My improvement relates to the construction of nut-locks; and it consists of a slide or continuous collar or ring, made of lead or other soft or compressible metal or material, having a hole so that it will fit or pass over the end of an ordinary bolt, and adapted to be pressed into the threads of the bolt and against the face of an ordinary nut by a suitable die.

My invention consists in features of novelty, hereinafter fully described, and pointed out in the claim.

Referring to the drawings, A represents the bolt; B, objects to be secured together, and C the nut. In these I claim no invention.

F represents a collar or ring, made of soft or compressible metal or material, which I prefer to form with a sloping or beveled outer portion, as shown.

E represents a die, made tubular in part or whole, and made conical at its inner portion, as shown at E'. The end of this die is placed against the ring or collar and driven or forced toward the nut, thus compressing the collar or ring into the threads of the bolt and pressing it up tight against the nut, as shown in Fig. 3, forming a collar or flange, G, on the ring, producing a water-tight joint between the ring and nut. The die is then removed, and the collar or ring thoroughly prevents the accidental removal or loosening of the nut, and, moreover, prevents any moisture getting between the nut and thread of the bolt, so that rust will not accumulate, causing the nut to stick upon the bolt and prevent its removal, and the threads are also thus prevented from rusting.

When it is desired to remove the nut, it can be done by means of a wrench, as the soft metal will be forced outward, not being able to resist the pressure or strain brought upon the nut, or the ring may be removed from the bolt after the nut is turned by cutting it open or melting it off, if desired.

I am aware that compressible rings and rings of soft metal have heretofore been used in various manners for locking nuts on bolts; but, so far as I am aware, in all of such devices heretofore proposed, some change in the form of the nut or the bolt was rendered necessary, or else they have not been capable of universal application, as is my improvement.

Letters Patent No. 152,737 show a locking-disk of sheet-lead, adapted to be forced over the end of a bolt, so that it will form a cap, and its edges will abut on the nut on said bolt. From its nature this form of nut-lock is capable of use only on short bolts, whereas, mine, being slipped freely over the end of the bolt, is not limited to any particular size thereof. When compressed to its locking position also, such a cap has a slot, exposing a portion of the screw-thread, a source of rust and weakness.

Letters Patent No. 189,984 show a recessed nut, within which a packing of soft metal is forced, so as to bind between the threads of the bolt and the sides of the recess. Such a construction implies a specially-formed nut, an element of trouble and expense, whereas my improved nut-lock can be quickly applied to any known form of bolt or nut.

Letters Patent No. 252,186 show and describe two ways in which a soft ring is to be used as a nut-lock. Either way necessitates the partial spoiling of the thread of the bolt. In one one side of the soft ring is flattened into a cut-away portion of the bolt, so that the other sides of the ring would bulge out and not grasp the threads at all, while in the other the soft ring is to be cast on the flattened bolt. This last is an expensive method, which could rarely be adopted, and which could not be used to advantage at all on overhead bolts or bridge-timber bolts.

Letters Patent No. 258,497 show an oval ring of malleable metal, interior projections on which are forced into opposite sides of a bolt-thread. These thus bite into and partially destroy the threads, and so prevent the rotation of the ring. This device and its method of operation are distinct from mine, in which a soft tapered ring is forced over the threads, so as not to bite into them, but to bear on them with sufficient friction to prevent rotation.

Letters Patent No. 332,540 show a nut and an oval ring formed in one. The ring being forced when screwed onto a bolt to assume a circular form, so binds on the nut as to prevent the rotation of itself and the nut which is integral therewith. The expense which would be necessary in making such a nut specially formed and its liability to become impaired by lapse of time, as well as the openness of the parts to rust, all show the importance of the soft ring nut-lock having a tapered outer surface, so that it can be closely compressed on the bolt-threads, and at the same time bind against and protect the nut.

Having thus described my invention, the following is what I claim as new therein and desire to secure by Letters Patent:

In combination with an ordinary threaded bolt and ordinary nut thereon, a separate soft locking-ring formed substantially as shown and described, and adapted to be slipped over the end of said bolt against said nut and compressed upon the threads of said bolt, substantially as set forth.

SAMUEL L. SHELLENBERGER.

In presence of—
 J. W. SWANN,
 C. F. CRUTCHER.